US009062798B2

United States Patent
Neef et al.

(10) Patent No.: US 9,062,798 B2
(45) Date of Patent: Jun. 23, 2015

(54) PRESSURE REGULATING DEVICE AND METHOD OF OPERATING A PRESSURE REGULATING DEVICE

(71) Applicant: FESTO AG & Co. KG, Esslingen (DE)

(72) Inventors: Bodo Neef, Neuhausen (DE); Sebastian Schill, Dettingen/Erms (DE)

(73) Assignee: FESTO AG & CO. KG, Esslingen (DE)

( * ) Notice: Subject to any disclaimer, the term of this patent is extended or adjusted under 35 U.S.C. 154(b) by 425 days.

(21) Appl. No.: 13/673,110

(22) Filed: Nov. 9, 2012

(65) Prior Publication Data

US 2013/0118595 A1  May 16, 2013

(30) Foreign Application Priority Data

Nov. 12, 2011  (EP) .................................. 11009009

(51) Int. Cl.
F16K 31/42 (2006.01)
F16K 47/04 (2006.01)
G05D 16/20 (2006.01)

(52) U.S. Cl.
CPC ............ *F16K 47/04* (2013.01); *G05D 16/2093* (2013.01)

(58) Field of Classification Search
CPC ... G05D 16/163; F16K 17/105; B60T 13/244; Y10T 29/49412; F15B 2013/008; F15B 15/222; F15B 20/008
USPC .................. 137/625.26, 625.25, 102, 596.14, 137/596.17, 596.18, 488, 627.5; 138/40
See application file for complete search history.

(56) References Cited

U.S. PATENT DOCUMENTS

| 3,354,894 | A | | 11/1967 | Stoll | |
|---|---|---|---|---|---|
| 3,646,969 | A | * | 3/1972 | Stampfli | 137/627.5 |
| 4,465,090 | A | * | 8/1984 | Morgan et al. | 137/102 |
| 4,565,209 | A | * | 1/1986 | Ruchser et al. | 137/116.3 |
| 5,065,665 | A | * | 11/1991 | Kimura | 91/433 |
| 5,067,519 | A | * | 11/1991 | Russell et al. | 137/596.14 |
| 5,682,918 | A | * | 11/1997 | Stoll et al. | 137/85 |
| 6,305,401 | B1 | * | 10/2001 | Uehara et al. | 137/102 |
| 6,584,999 | B2 | * | 7/2003 | Inayama et al. | 137/487.5 |
| 6,779,541 | B2 | * | 8/2004 | Inayama et al. | 137/102 |
| 7,077,481 | B2 | * | 7/2006 | Marsh et al. | 303/40 |
| 7,766,030 | B2 | * | 8/2010 | Askew | 137/85 |

(Continued)

FOREIGN PATENT DOCUMENTS

| EP | 0726511 | 8/1996 |
|---|---|---|
| EP | 1832950 | 9/2007 |
| JP | 5158552 | 6/1993 |

*Primary Examiner* — Craig Schneider
*Assistant Examiner* — Minh Le
(74) *Attorney, Agent, or Firm* — Hoffmann & Baron, LLP

(57) ABSTRACT

A pressure regulating device has a pressure regulating valve with a valve casing and a regulating unit which is movable relative to the former. The regulating unit contains an actuation element which may be moved by a control pressure, and two first and second closing members, each spring-biased in a closed position, which may be switched by the actuation element. The connection between a primary port and a secondary port is controlled by the first closing member. Fixed immovably to the actuation element is a restrictor element which is moved into a restriction position when the actuation element is so positioned that the first closing member is normally moved into its closed position. If, because of a fault, the first closing member is not moved into the closed position, only a very small amount of pressure medium flows to the secondary port, so that consequential damage may be avoided.

15 Claims, 3 Drawing Sheets

(56) References Cited

U.S. PATENT DOCUMENTS

| | | | |
|---|---|---|---|
| 7,766,040 B2 * | 8/2010 | Bamber | 137/625.26 |
| 8,205,632 B2 * | 6/2012 | Fishwick | 137/102 |
| 8,230,881 B2 * | 7/2012 | Scherer et al. | 137/596.17 |
| 8,631,826 B2 * | 1/2014 | Lovell et al. | 137/625.66 |
| 8,847,103 B2 * | 9/2014 | Retnaswamy | 219/121.55 |
| 2009/0283160 A1 * | 11/2009 | Fishwick et al. | 137/596.14 |
| 2012/0298234 A1 * | 11/2012 | Haehn et al. | 137/625.25 |

* cited by examiner

PRESSURE REGULATING DEVICE AND METHOD OF OPERATING A PRESSURE REGULATING DEVICE

BACKGROUND OF THE INVENTION

The invention relates to a pressure regulating device with a pressure regulating valve which has a valve casing with a primary port for the supply of pressure medium, a pressure-regulated secondary port for connection to a load, and a vent port, wherein there is provided between the secondary port and the primary port a first overflow port bordered by a first valve seat and a second overflow port bordered by a second valve seat, wherein a first closing member with a spring bias in the direction of a closed position abutting the first valve seat lies opposite the first valve seat, and a second closing member with a spring bias in the direction of a closed position abutting the second valve seat lies opposite the second valve seat, wherein both closing members belong to a regulating unit which is movable relative to the valve casing, which also contains an actuation element which is movable relative to the two closing members and may be driven under the influence of a control pressure to a regulating movement relative to the valve casing, by means of which each closing member may be moved into at least one open position lifted from the assigned valve seat.

The invention also relates to a method for the operation of such a pressure regulating device.

A pressure regulating device of this kind is known from EP 0 726 511 B1. The core element of this pressure regulating device is a proportionally actuable pressure regulating valve with a regulating unit movable relative to a valve casing and containing a plunger-like actuation element and two closing members resting on the former and movable relative to the actuation element. Each closing member is biased by a spring device towards a closed position in contact with an opposing valve seat, wherein a first valve seat borders a first overflow port running between a primary port and a secondary port, and a second valve seat borders a second overflow port connecting the secondary port to a vent port. In operation of the pressure regulating device, a fluidic pressure medium under a primary pressure is present at the primary port and may be output to a load at the secondary port with a controllable secondary pressure. The level of the secondary pressure may be regulated at a constant pressure value by the positioning of the regulating unit, with the possibility of using a control pressure to act on the actuation element so that the latter executes a regulating movement in the course of which it provides for movement of the two closing members into either a closed position in which the assigned overflow port is closed or into one or more open positions lifted from the assigned valve seat and thereby opening the assigned overflow port for a pressure medium flowing through it.

If in the case of the known valve a malfunction occurs, which prevents an essentially desired closing of the first closing member controlling the connection between the primary port and the secondary port, this may lead to functional impairment or even to hazardous situations with a load connected on the secondary side.

SUMMARY OF THE INVENTION

The invention is based on the problem of taking measures which make it possible to avoid impairments affecting the connected load associated with malfunction of the first closing member.

To solve this problem for a pressure regulating device of the type described above, the regulating unit is provided, in addition to the two closing members, with a restrictor element fixed to the actuation element and accompanying the regulating movement of the former. In a position of the actuation element which allows the first closing member to adopt its closed position, the restrictor element adopts a restriction position narrowing the flow cross-section between the primary port and the secondary port to a restricting gap, as compared to the maximum open position of the first closing member which may be produced by the actuation element.

The pressure regulating device therefore also has an integral restrictor valve which can only be effective when the actuation element, in the course of its regulating movement, has been shifted into a position in which it allows the first closing member to assume its closed position. In this operating position of the actuation element the first closing member, spring-biased in the closed position when the pressure regulating valve functions correctly, should adopt its closed position to prevent any further fluid supply to the secondary port. However, due to malfunctions, for example jamming of the first closing member in the open position or a break in the spring device biasing this first closing member in the closed position, it may happen that the first closing member does not switch over into the closed position even though it should actually do so, and this would be possible because of a corresponding switched position of the actuation element. In such a case, the effect of the restrictor element provided on the actuation element comes into play, namely that independently of the first closing member, the flow cross-section between the primary port and the secondary port is so narrowed that a restricting gap is created which allows only a now very restricted fluid flow. With suitable design it is easy to ensure that the flow rate still possible through the restricting gap has a low level which is quite safe for the load connected to the secondary port. There is also the advantageous possibility, through monitoring the secondary pressure with the aid of the low residual pressure occurring on the secondary side in the event of the aforementioned malfunction, of detecting a malfunction and initiating immediate measures to avoid consequential damage. For example the pressure supply to the primary port may then be shut off.

An advantageous method of operating such a pressure regulating device lies in the generation, using an electronic control unit and based on a preset or presettable secondary pressure setpoint value and a secondary pressure actual value prevailing at the secondary port, of a control pressure used to drive the actuation element. This involves the generation of an electrical message signal if the secondary pressure does not fall below a preset or presettable residual pressure value, even though the actuation element—in particular through reduction of the control pressure to atmospheric pressure—is so activated in respect of its control pressure that it is or may be switched into a position allowing the first closing member to adopt its closed position.

In this way a conclusion may be reached regarding a fault situation of the first closing member, based solely on determined or monitored pressure values. Costly and error-prone electrical sensor means for the position monitoring of components of the regulating unit are therefore not required.

Advantageous developments of the invention are disclosed in the dependent claims.

It is of advantage for the restrictor element to be so mounted on the actuation element that, in the position of the actuation element which presets the open position of the first closing member, it lies outside the first overflow port and in the restriction position dips expediently completely into the overflow port. The pressure medium which in the restriction position is still overflowing from the primary port to the secondary port therefore flows past the restrictor element on the radial outside and through an annular restricting gap which is formed in particular concentric, and radially between the restrictor element and the peripheral wall of the first overflow port encompassing the restrictor element.

Preferably the restrictor element is in the form of an annular projection extending radially from the actuation element, which might also be described as a ring collar. Expediently it has the flat shape of an annular disc.

In principle it is possible to attach the restrictor element to the actuation element as a separate component. However, a design regarded as more expedient is one in which the restrictor element is made integral with the actuation element and may therefore be moulded on directly in production of the actuation element.

The actuation element expediently has a stop member which, during a suitable regulating movement, acts on the first closing member in such a way that the latter is shifted into the open position, against the operative spring force. A further such stop member is expediently assigned to the second closing member, to move the latter into its open position during a suitable regulating movement. The stop member assigned to the first closing member may be provided in addition to the restrictor element responsible for the restriction function described above. Regarded as especially expedient is a variant in which the stop member and the restrictor element form a unit, with the stop member also functioning as restrictor element and vice-versa.

Preferably the restrictor element is so designed and so adapted to the cross-section of the assigned first overflow port that the secondary pressure present at the secondary port, when the first closing member is shifted into an open position and moreover the restrictor element adopts the restriction position and the first closing member is at the same time in the maximum open position, amounts to a maximum of 10% of the primary pressure at the primary port, while the secondary pressure expediently does not exceed 1 bar.

The pressure regulating device is expediently equipped with an electronic control unit, which is designed to generate an electrical message signal, when the secondary pressure actual value prevailing at the secondary port does not fall below a preset residual pressure value lying above atmospheric pressure, even though the actuation element is pressurised by a control pressure lying in particular at zero level or atmospheric level and which generates switching of the actuation element into a position allowing the first closing member to adopt its closed position. The message signal may be transmitted for example as a visual or audible alarm signal, and/or may be used to initiate subsequent actions, for example a complete shut-off of an upstream main valve supplying the primary port with primary pressure.

The pressure regulating device expediently contains a secondary pressure sensor device which detects secondary pressure at the secondary port. With the aid of such a secondary pressure sensor device, the secondary pressure actual value may therefore be monitored, and specifically on the one hand to execute the normal regulation function of the pressure regulating device and on the other hand for monitoring in respect of a fault situation in which the restrictor element of the actuation element is operative.

The pressure regulating device contains expediently an electronic control unit, to which the secondary pressure sensor device is connected.

Preferably the secondary pressure sensor device contains two functional parallel-connected pressure sensors, so as to provide redundancy and to ensure continued precise pressure monitoring of the secondary pressure even if one of the pressure sensors fails.

The pressure regulating device is preferably equipped with a primary pressure sensor device which detects the primary pressure prevailing at the primary port and is preferably connected to an electronic control unit of the pressure regulating device which expediently cooperates in generating the control pressure driving the actuation element.

To provide the control pressure acting on the actuation element, the pressure regulating device expediently contains an electrically actuable pilot valve device, connected actively on the outlet side to the actuation element. The inlet of the pilot valve device is expediently connected directly to the primary port of the pressure regulating valve, so that an internal pressure tap to feed the pilot valve device is possible and external fluid hoses are not required.

The pressure regulating device expediently has an internal drive chamber which is bounded by a movable drive wall connected for driving purposes to the actuation element and communicating with a control passage through which the control pressure desired for driving the actuation element may be fed into the drive chamber. The pilot valve device has in particular an air supply valve device connected to the control passage and electrically actuable, together with an electrically actuable vent valve device, similarly connected to the control passage. A control pressure of the desired level may therefore be provided through harmonised, in particular also alternating, actuation of the air supply valve device and the vent valve device. The two valve devices may in particular be clocked using the so-called pulse width modulation method.

The air supply valve device expediently contains two air supply valves connected in series and actuated simultaneously, so that even if one of the air supply valves fails, a reliable isolating function continues to be ensured, and it is possible in such a fault situation to continue to shut off the fluid supply to the actuation element.

The vent valve device expediently contains two functional parallel-connected and likewise simultaneously actuable vent valves, while the parallel connection ensures reliable venting even if one of the vent valves fails due to a malfunction.

BRIEF DESCRIPTION OF THE DRAWINGS

The invention is explained in detail below with the aid of the appended drawings, which show in.

DETAILED DESCRIPTION OF THE INVENTION

Figure 1:
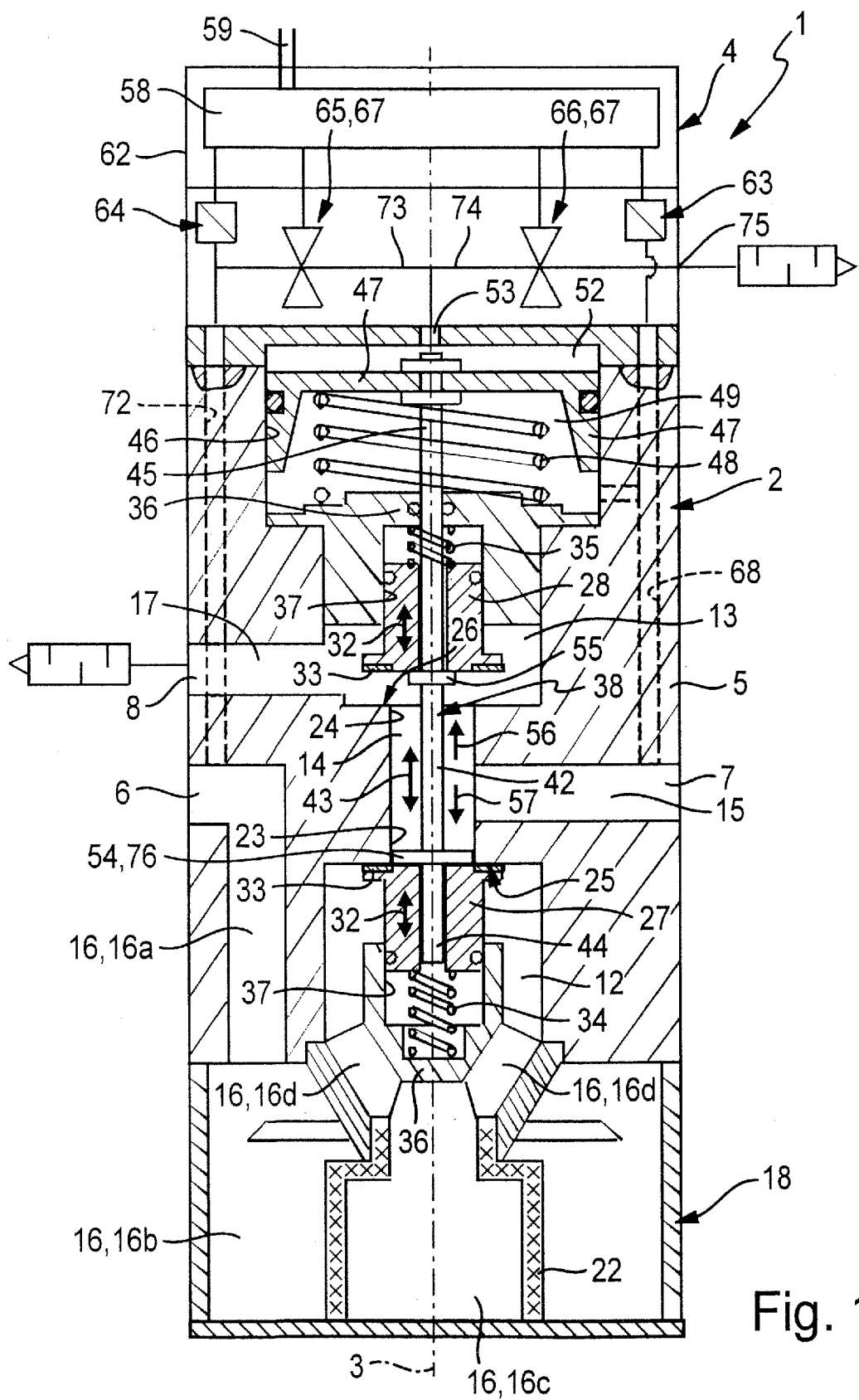
FIG. 1 a preferred embodiment of the pressure regulating device according to the invention in a longitudinal section with vented secondary port FIG. 2 the pressure regulating device of FIG. 1 in the regular state of the secondary port, connected to the primary port and therefore supplied with air, and FIG. 3 the pressure regulating device of FIGS. 1 and 2 in the state in which a fault has occurred in which the first closing member has not as desired switched into the closed position, but is stuck in the open position.

The pressure regulating device altogether designated by reference number 1 contains a pressure regulating valve 2 with a longitudinal axis 3 and a control head 4, in particular attached to the end face of the pressure regulating valve 2.

The pressure regulating valve 2 has a valve casing 5, on the outer surface of which are formed several openings which form a primary port 6, a secondary port 7 and a vent port 8.

The primary port 6 serves to feed in a fluidic pressure medium, in particular compressed air, which is under a primary pressure. This pressure medium is supplied from a pressure source, not shown, which is or may be connected to the primary port 6 via a suitable fluid line. A shut-off valve may be inserted in this connection, so as to open or close the connection between pressure source and primary port 6 as desired.

The secondary port 7 forms an operating connection and provides pressure medium under regulated secondary pressure for an external load to be actuated.

The secondary pressure may be regulated with the aid of the pressure regulating device 1 to a constant value of any desired presettable level.

The vent port 8 is constantly at atmospheric pressure. It serves to vent a load connected to the secondary port 7, in order to lower the secondary pressure or reduce it to zero, i.e. to the ambient pressure.

Formed inside the valve casing 5, and spaced apart in the axial direction of the longitudinal axis 3, are a first valve chamber 12 and a second valve chamber 13. The two valve chambers 12, 13 are connected to one another by means of a connecting passage 14 extending coaxially between them. From the side of the connecting passage 14, an operating passage 15 leads to the secondary port 7.

The first valve chamber 12 communicates with the primary port 6 via a feed passage 16 comprised of several passage sections 16a, 16b, 16c, 16d. The second valve chamber 13 is connected via a vent passage 17 to the vent port 8.

A component part of the pressure regulating valve 2, in particular the end section opposite the control head 4, is expediently in the form of a filter unit 18, in which the pressure medium flowing from the primary port 6 into the first valve chamber 12 is filtered. The filter unit 18 contains an air-permeable filter body 22, which retains impurities, and which separates a filter inlet chamber formed by passage section 16b from a filter outlet chamber formed in its interior by another passage section 16c. The filter inlet chamber 16b is connected to the primary port 6 via a passage section 16a of the feed passage passage section 16, while the filter outlet chamber 16c communicates with the first valve chamber 12 via one or more passage sections 16d of the feed passage 16. The filter unit 18 is optional and may therefore also be omitted. Also possible, therefore, is an unfiltered direct connection between the primary port 6 and the first valve chamber 12.

The length section of the connecting passage 14 adjoining the first valve chamber 12 forms a first overflow port 23, while the length section of the connecting passage 14 adjoining the second valve chamber 13 forms a second overflow port 24. Since the operating passage 15 leads into the connecting passage 14, each overflow port 23, 24 makes possible a fluidic connection between its assigned valve chamber 12, 13 and the secondary port 7.

The two overflow ports 23, 24 open out, with opposite orientation to one another, into the valve chambers 12, 13. Here the first overflow port 23 is bordered by a first valve seat 25 and the second overflow port is bordered by a second valve seat 26. The two valve seats 25, 26 are in particular formed directly on the valve casing 5, and face in opposite directions along the longitudinal axis 3.

Located movably in the first valve chamber 12 is a first closing member 27. The closing member movement which is possible here and which involves a linear movement, is illustrated by a double arrow at 32.

The second closing member 28 is similarly movably mounted in the second valve chamber 13 in such a way that it can execute a closing member movement 32 in the axial direction of the longitudinal axis 3.

Each closing member 27, 28 has on the end face which faces the assigned valve seat 25, 26 a sealing section 33. Each closing member 27, 28 may in the course of its closing member movement 32 be moved into a closed position or into at least one open position. In the closed position it lies with its sealing section 33 in sealing contact with the assigned valve seat 25, 26 and closes the associated overflow port 23, 24, so that no fluid transfer is possible between the relevant valve chamber 12 or 13 and the secondary port 7. In the open position, the relevant closing member 27, 28 is lifted to a greater or lesser extent from the assigned valve seat 25, 26, thereby opening a flow cross-section corresponding to the extent of the distance from the valve seat 25, 26 and allowing a fluid transfer.

FIG. 1 shows the first closing member 27 on adoption of its closed position and the second closing member 28 on adoption of a maximum open position releasing a maximum flow cross-section of the second overflow port.

Both closing members 27, 28 are spring-biased in the direction of their closed position. For this purpose, each closing member 27, 28 is expediently assigned a spring device which, in the case of the first closing member 27 is designated as the first spring device 34 and in the case of the second closing member 28 as the second spring device 35.

By way of example, the spring devices 34, 35 are compression spring devices. Each spring device 34, 35 is located on the rear side of the associated closing member 27, 28 axially opposite the sealing section 33, resting at one end axially on the closing member 27, 28, and at the other end on a support wall 36 fixed to the valve casing.

Expediently, each closing member 27, 28 is guided with linear sliding capability in a guide recess 37, immovable relative to the valve casing 5 and leading into the assigned valve chamber 12, 13. Each closing member 27, 28 dips with its rear side into such a guide recess 37. The support wall 36 is formed by the base of the guide recess 37.

The two closing members 27, 28 are components of a multi-part regulating unit 38 of the pressure regulating valve 2 which also contains an actuation element 42—rod- or plunger-like in the embodiment and extending inside the valve casing 5 in a coaxial alignment relative to the longitudinal axis 3, and movable relative to the valve casing 5 through the execution of a linear regulating movement 43 indicated by a double arrow.

The actuation element 42 has a first end section 44 extending into the first valve chamber 12. From this first end section 44 it extends coaxially through the first overflow port 23 and the second overflow port 24 into the second valve chamber 13. However, while it ends with its first end section 44 within the first valve chamber 12, it passes with its opposite axial end section through the support wall 36 assigned to the second valve chamber 13 and extends with a second end section 45 into a control chamber 46, which is also formed in the valve casing 5.

The second end section 45 of the actuation element 42 is movement-coupled to a drive wall 47 mounted so as to be axially movable in the control chamber 46. By way of example, the drive wall 47 is in the form of a driving piston, mounted slidably in the control chamber 46. In another embodiment, the drive wall 47 is provided by a membrane.

A resetting spring device 48, in particular in the form of a compression spring, acts constantly between the valve casing 5 and the drive wall 47, and therefore presses the drive wall 47, including the actuation element 42 which in the embodiment is fastened to it, towards a normal position which in terms of function is a venting position. The resetting spring device 48 is located in the section of the control chamber 46 lying between the drive wall 47 and the second valve chamber 13, and is designated as the spring chamber 49.

The drive wall 47 bounds, on the side facing axially away from the two valve chambers 12, 13, a section of the control chamber 46 designated below as the drive chamber 52. Leading into this drive chamber 52 is a control passage 53 which in operation serves to feed pressure medium under a secondary pressure into the drive chamber 52; this pressure medium pressure-loads the drive wall 47 and therefore also the actuation element 42 against the direction of action of the resetting spring device 48. If the secondary pressure is sufficiently high, then the actuation element 42 can be driven to make a regulating movement 43, in the course of which it switches over to an air supply position as evident from FIG. 2.

Through variation of the control pressure, the regulating movement 43 may also be generated in one or the other direction of movement.

For each closing member 27, 28, the actuation element 42 has a stop member, with the stop member assigned to the first closing member 27 being designated as the first stop member 54, and the stop member assigned the second closing member 28 being designated as the second stop member 55. The two stop members 54, 55 are spaced apart in the axial direction of the longitudinal axis 3.

The first stop member 54 is mounted axially in front of the first closing member 27 in the area of the first overflow port 23. The second stop member 55 is mounted axially in front of the second closing member 28 in the area of the second overflow port 24. Each stop member 54, 55 forms a movement stop for the assigned first or second closing member 27, 28, which are able to be moved relative to the actuation element 42 in the axial direction of the longitudinal axis 3. The two closing members 27, 28 may be moved independently of one another relative to the valve casing 5 and also to the actuation element 42. Through the respectively assigned spring device 34, 35 they are constantly spring-loaded towards the stop member 54, 55 mounted in each case in front of them.

In the normal position of the pressure regulating device 1, corresponding to the venting position of the actuation element 42 shown in FIG. 1, the drive chamber 52 is unpressurised, since the applied control pressure is zero, i.e. corresponds absolutely to atmospheric pressure. In this case the action of the resetting spring device 48 is brought to bear in full, so that the actuation element 42 is shifted in a venting direction 56 to the maximum towards the control chamber 46.

In this venting position 56, the second closing member 28 is lifted from the second valve seat 26 by the second stop member 55, so that the secondary port 7 is vented towards the vent port 8 via the open second overflow port 24. At the same time, the second overflow port 24 is closed, since the first stop member 54 dips so far into the first overflow port 23 that the first closing member 27 is biased by the actuating force of the first spring device 34 to fit up against the first valve seat 25 and adopt the closed position.

Figure 2:
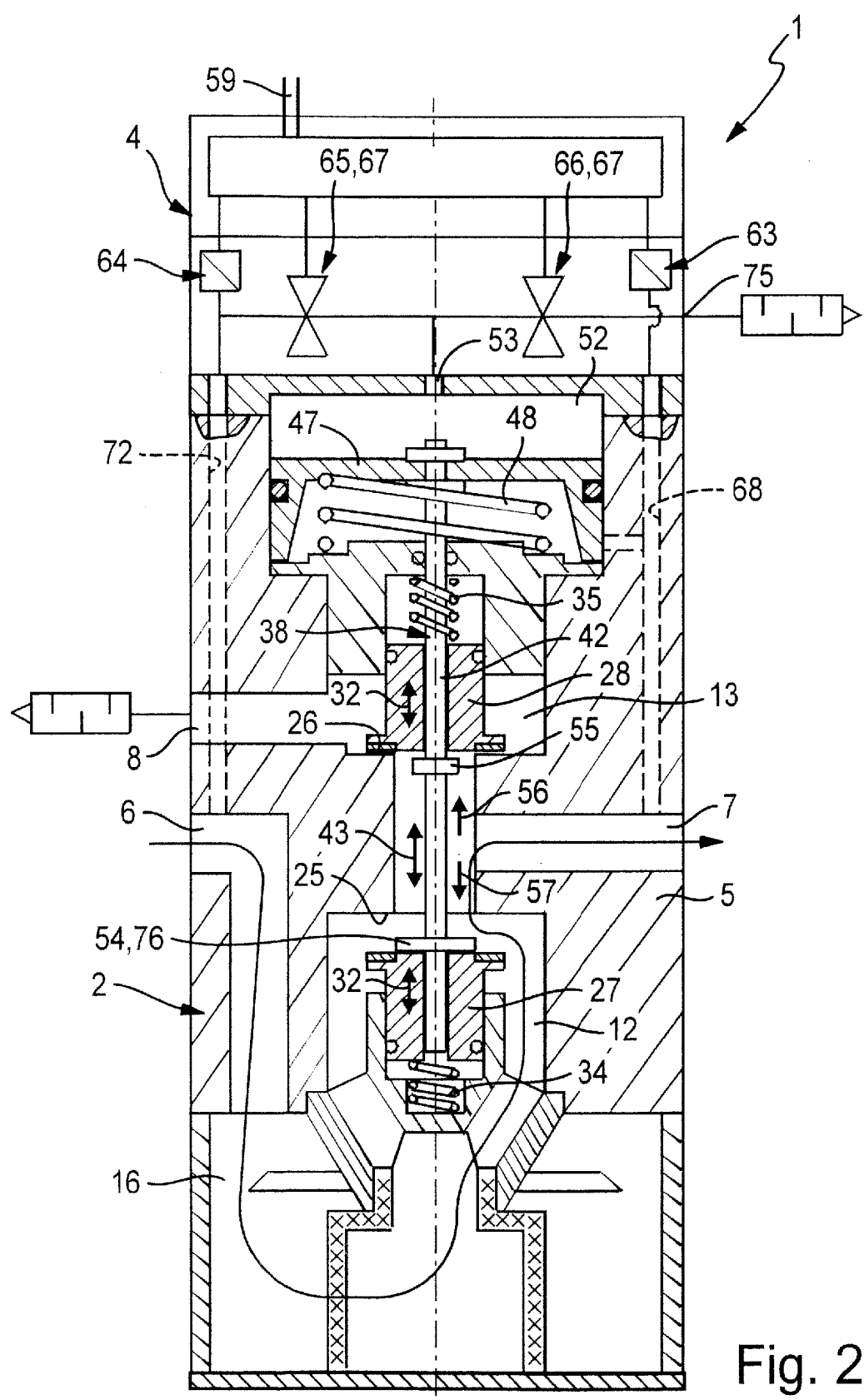

When a pressure build-up is desired at the secondary port 7, a switching of the actuation element 42 into the air supply position evident from FIG. 2 is generated. This is obtained by feeding into the drive chamber 52 a pressure medium under a suitably high control pressure which is able to overcome the counter-force of the resetting spring device 48. As a result of the increased control pressure, the actuation element 42 performs a regulating movement 43 in a direction of air supply 57 opposite to the venting direction 56. As a consequence of this, on the one hand the second stop member 55 dips into the second overflow port 24, so that the second closing member 28 biased by the second spring device 35 follows until it makes contact with the assigned second valve seat 26 and the associated adoption of the closed position. The fluid connection between the secondary port 7 and the vent port 8 is thereby broken.

On the other hand, the first stop member 54 also moved in the direction of air supply 57 presses from the side of the first overflow port 23 on the first closing member 27, lifting the latter from the first valve seat 25, overcoming the spring force of the first spring device 34, so that it adopts an open position, with FIG. 2 showing the maximum open position.

The fluidic activation of the actuation element 42 by means of the control pressure is effected with the aid of the components of the control head 4. One of these components consists of an electronic control unit 58, which is able to communicate over interface means 59 of the pressure regulating device 1 with an external control unit which is not depicted. The electronic control unit 58 is expediently located in a separate electronics module 62 of the control head 4.

Other components of the control head 4 are preferably a secondary pressure sensor device 63, a primary pressure sensor device 64, and an electrically actuable pilot valve device 67, preferably comprised of an electrically actuable air supply valve device 65 and a vent valve device 66 which may be operated independently of the former.

The secondary pressure sensor device 63 makes a fluidic connection with the secondary port 7 via a secondary pressure tapping passage 68. The secondary pressure tapping passage 68 also communicates expediently with the spring chamber 49 of the control chamber 46 which is opposite the drive chamber 52 and accommodates the resetting spring device 48.

The primary pressure sensor device 64 makes fluidic connection with the primary port 6 via a primary pressure tapping passage 72 and is therefore able to detect the primary pressure.

Both sensor devices 63, 64 are electrically connected to the electronic control unit 58.

The air supply valve device 65 is interposed in the course of a pilot air supply passage 73 which connects the primary port 6 to the control passage 53, with the primary pressure tapping passage 72 forming by way of example a length section of the pilot air supply passage 73. The vent valve device 66 is interposed in a pilot vent passage 74 which connects the control passage 53 to a pilot vent port 75 provided expediently on the control head 4 and leading to the atmosphere. Both valve devices 66, 67 are in turn connected electrically to the electronic control unit 58.

In operation, the pressure regulating device 1 regulates the secondary pressure at the secondary port 7, which has the level of a secondary pressure actual value corresponding to a secondary pressure setpoint value stored in the electronic control unit 58. The secondary pressure setpoint value may be input to the electronic control unit 58 from outside via the interface means 59. The comparison between secondary pressure setpoint value and secondary pressure actual value takes place in the electronic control unit 58 which, depending on the result of the comparison, generates electrical control signals which are fed to the pilot valve device 67 in order to produce an appropriate increase or reduction in the secondary pressure present in the drive chamber 52. The secondary pressure actual value is detected by the secondary pressure sensor device 63 which, for reasons of enhanced reliability, consists expediently of two functional pressure sensors connected in parallel and operating redundantly. Even if one pressure sensor fails, reliability is assured through the continuing operation of the other pressure sensor.

The two valve devices 66, 67 each contain by way of example at least one switching valve, with provision for pulse-width-modulated activation and clocked operation. Harmonised with one another, the valve devices 66, 67 are in particular operated alternately.

With the pressure regulating device 1, special value is placed on the fact that the venting function is safeguarded. Because of this, safe venting of the load connected to the secondary port 7 is ensured in an emergency.

In this connection, the vent valve device 66 expediently contains two functionally parallel-connected, redundant standalone vent valves, not shown in detail, each of which may on its own undertake the desired venting function. They are operated in parallel in the same direction, so that even if one vent valve fails, the venting function is still provided.

The air supply valve device 65 expediently contains two air supply valves, operable independently of one another and connected in series. They are not shown in detail in the drawing. In operation of the pressure regulating device 1 they are actuated synchronously in the same direction. Each air supply valve is, as also expediently each vent valve, designed as a 2/2-way valve and is therefore able to release or block alternately the fluid flow through the pilot air supply passage 73. The connection in series of two standalone air supply valves ensures that isolation of the pilot air supply passage 73 required in connection with venting of the control passage 53 is ensured even one of the two vent valves should fail.

The pressure regulating device 1 is moreover provided with means which make it possible, in a simple manner, to detect a malfunction of the first closing member 27 due to the first closing member 27 sticking in an open position even though the actuation element 42 has moved into the air supply position and therefore the first closing member 27 should actually have been shifted into its closed position by the assigned first spring device 34.

Figure 3:
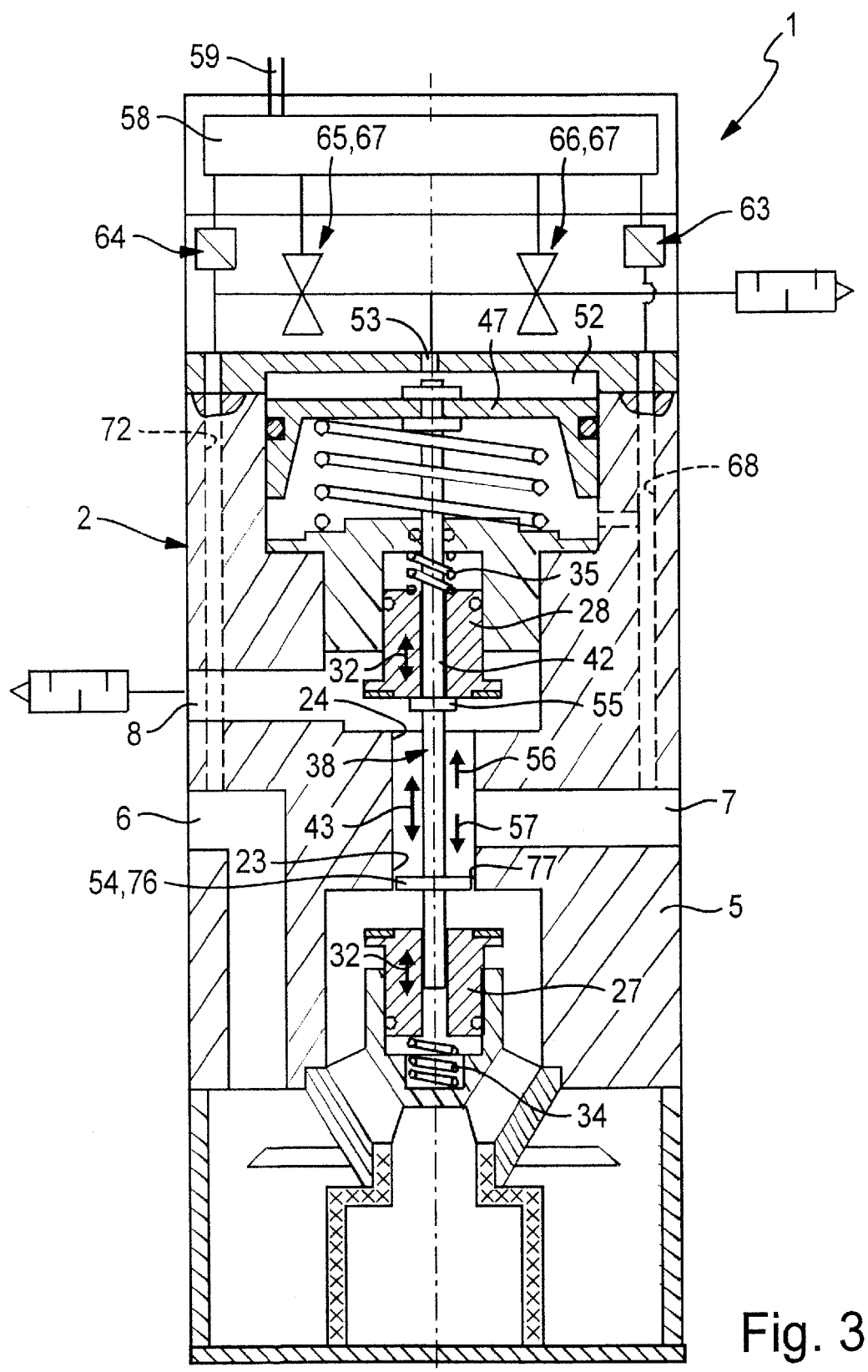

In the embodiment, to make this fault detection possible, the first stop member 54 of the actuation element 42 which acts to open and hold open the first closing member 27 is in the form of a restrictor element 76 which, in the venting position of the actuation element 42 evident from FIGS. 1 and 3, adopts a restriction position with respect to the assigned first overflow port 23, in which it narrows the flow cross-section open between the primary port 6 and the secondary port 7 to a restricting gap 77 such that a restricting effect occurs. It may therefore be said that the pressure regulating device 1 has an additional restrictor valve assigned to the first closing member 27 and formed by the restrictor element 76 and the valve casing 5.

In the exemplary pressure regulating valve 2, the closed position of the first closing member 27 is characterised in that the first stop member 54 dips axially into the first overflow port 23, at least partly and preferably completely. Similarly the second stop member 55 dips at least partly and preferably completely into the second overflow port 24 when the second closing member 28 adopts its closed position. However, whereas the second stop member 55 has a relatively small cross-sectional area, so that only a small fraction of the second overflow port 24 can be filled, the first stop member 54, in order to form a restrictor element 76, has a much greater cross-sectional area, so that when dipped into the first overflow port 23, the cross-section of this first overflow port 23 is approximately filled up. There then remains only a small, preferably annular restricting gap 77 between the outer periphery of the restrictor element 76 and the peripheral surface of the first overflow port 23, which is available as a flow gap and which defines the flow cross-section available for the pressure medium.

This flow cross-section is in particular much smaller than the flow cross-section available to the pressure medium in the air supply position according to FIG. 2, with the first closing member 27 open to the maximum extent for passage through the first overflow port 23.

Instead of the restrictor element 76 as in the embodiment forming an integral unit with the first stop member 54, it may be made as a separate part of the actuation element 42 and for example adopt a position with axial clearance from the first stop member 54. This is appropriate in particular when the first stop member 54, through suitably modified design of the first closing member 27, comes to lie inside this first closing member 27. Irrespective of this, the restrictor element 76 is in any case mounted constantly immovably on the actuation element 42 so that it accompanies its regulating movement 43. It is also a component which is provided in addition to the two first and second closing members 27, 28, which are decoupled mechanically from one another.

So that the restrictor element 76 does not impair the fluid flow between the primary port 6 and the secondary port 7 when the air supply position is in accordance with FIG. 2, the restrictor element 76 is in particular so placed on the actuation element 42 that, in the air supply position of the actuation element 42 and in particular in the air supply position presetting the maximum open position of the first closing member 27, it lies completely outside the first overflow port 23 and is expediently mounted in front of the first overflow port 23 with adequate axial clearance.

The restrictor element 76 is preferably in the form of an annular projection protruding radially from the actuation element 42, wherein the actuation element 42 is arranged axially either side of the restrictor element 76, being in particular plunger-like or rod-shaped. The restrictor element 76 is preferably a single-piece component of the actuation element 42.

The restrictor element 76 always adopts its restriction position when the actuation element 42 is switched to the venting position. However, it exercises its restriction function only when there is at the same time a malfunction of the first closing member 27, with the first closing member 27 remaining open. When in normal operation, the first closing member 27 adopts its closed position according to FIG. 1 in the venting position of the actuation element 42, the restrictor element 76 remains inoperative, since the first closing member 27 completely shuts off the fluid flow between the primary port 6 and the secondary port 7.

Preferably, in the restriction position of the restrictor element 76, owing to a suitable reciprocal matching of the cross-sectional surfaces of the restrictor element 76 and the first overflow port 23, such a high restriction intensity is achieved that, in the malfunction described, the secondary pressure actual value at the secondary port 7 amounts to no more than 10% of the primary pressure at the primary port 6, while it does not exceed a secondary pressure actual value of 1 bar when the primary pressure lies above 1 bar. This observation applies in conjunction with a second closing member 28 simultaneously adopting its open position, i.e. when the actuation element 42 has been moved into the venting position. Certainly the pressure medium flowing through the restricting gap 77 may then be vented with a relatively high volume flow through the available open vent port 8, but equally no complete drop in pressure is possible, so that a secondary pressure continues to be present at the secondary port 7, and has a certain excess pressure residual value. This excess pressure residual value has, as the name indicates, a certain excess pressure as residual pressure value and therefore lies above atmospheric pressure; at the same time, though, it amounts to a maximum 10% of the primary pressure value at the primary port, and expediently does not exceed an upper limit of 1 bar when the primary pressure lies above 1 bar.

The restriction behaviour described is made use of in the detection of functional failure of the first closing member 27 due to breakage of the first spring device 34 or jamming of the opened first closing member 27.

The electronic control unit 58 is so programmed that it makes a plausibility check at least when a control pressure is applied in the drive chamber 52 at a level which causes the actuation element 42 to switch to the venting position, in order to vent the secondary port 7 or to switch it to an unpressurised state. Since in the embodiment the actuation element 42 is constantly pressure-loaded by the resetting spring device 48 towards the venting position, the control pressure to be applied for switching into the venting position amounts to 0 bar, which is achieved by the fact that the drive chamber 52 is vented to atmospheric pressure by opening of the vent valve device 66. The plausibility test involves, with the aid of the secondary pressure sensor device 63, checking the secondary pressure to see whether the secondary pressure actual value actually falls to zero in accordance with the setting, or whether it retains a slightly increased pressure level corresponding to the residual pressure value referred to above. If the latter is the case, this is interpreted by the electronic control unit 58 as a spring device of the first closing member 27, and the electronic control unit 58 generates an electrical message signal.

The electronic message signal may for example be or generate an audible and/or visual alarm signal. Similarly, the pressure regulating device 1 may be so designed that the electrical message signal is output at the interface means 59 of the electronic control unit 58 and for example is fed to the external control unit connected there, which may generate at least one further action, for example a shut-down of the fluid supply of the primary port 6 of the pressure regulating device 1. Other measures are also conceivable.

The plausibility test takes into account the primary pressure at the primary port 6, as determined by the primary pressure sensor device 64.

A further advantageous safety feature of the pressure regulating device 1 according to the example lies in the fact that, in the event of a failure of the resetting spring device 48, the first closing member 27 is opened by the force of pressure which is present. In addition, the electronic control unit 58 is expediently so programmed that, in such a case, based on the rise in the secondary pressure determined by the secondary pressure sensor device 63, the control pressure imposed on the actuation element 42 is reduced to zero, so that the secondary pressure acting on the second closing member 28 is itself able to move the second closing member 28 into the open position and to vent the secondary port 7.

The electronic control unit 58 is expediently as a further safety measure in the form of two redundant internal electronic control units. In an advantageous operating mode of the pressure regulating device 1, the secondary pressure is determined reliably by the two parallel-connected pressure sensors of the secondary pressure sensor device 63, while the two pressure sensors are monitored for faults through the redundant internal electronic control units. If a fault occurs or a limit value is exceeded, then the actuation element 42 is switched into the venting position, so as to vent the secondary port 7 and the downstream pneumatic system or another load. Faults may be read out over the electrical interface means 59. Only after a rest and fresh self-test can the pressure regulating device 1 be brought back into operation.

The invention claimed is:

1. A pressure regulating device, with a pressure regulating valve which has a valve casing with a primary port for the supply of pressure medium, a pressure-regulated secondary port for connection to a load, and a vent port, wherein there is provided, between the secondary port and the primary port, a first overflow port bordered by a first valve seat and, between the secondary port and the vent port, a second overflow port bordered by a second valve seat, wherein a first closing member with a spring bias in the direction of a closed position abutting the first valve seat lies opposite the first valve seat, and a second closing member with a spring bias in the direction of a closed position abutting the second valve seat lies opposite the second valve seat, wherein both closing members belong to a regulating unit, which is movable relative to the valve casing, which also contains an actuation element which is movable relative to the two closing members and is driven under the influence of a control pressure to a regulating movement relative to the valve casing, by means of which each closing member is moved into at least one open position lifted from the assigned valve seat, and wherein the regulating unit comprises, in addition to the two closing members, a restrictor element fixed to the actuation element and accompanying the regulating movement of the actuation element, while in a position of the actuation element which allows the first closing member to adopt its closed position, the restrictor element adopts a restriction position narrowing the flow cross-section between the primary port and the secondary port to a restricting gap, as compared to the maximum open position of the first closing member which is produced by the actuation element.

2. A pressure regulating device according to claim 1, wherein the restrictor element is so mounted on the actuation element that, in the position of the actuation element which presets the open position of the first closing member, it lies completely outside the first overflow port and in the restriction position dips at least partly and expediently completely into the first overflow port.

3. A pressure regulating device according to claim 1, wherein the restrictor element is in the form of an annular projection extending radially from the actuation element.

4. A pressure regulating device according to claim 1, wherein the restrictor element is a single-piece component of the actuation element.

5. A pressure regulating device to according to claim 1, wherein the actuation element has a stop member, acting on the first closing member to shift the first closing member into the open position, and at the same time forming the restrictor element.

6. A pressure regulating device according to claim 1, wherein the restrictor element is so designed that on adoption of the restriction position of the restrictor element with the first closing member simultaneously in the maximum open position, and likewise the second closing member adopting an open position, the secondary pressure at the secondary port has an excess pressure as residual pressure value which amounts to a maximum of 10% of the primary pressure value at the primary port and at the same time does not exceed 1 bar.

7. A pressure regulating device according to claim 1, further comprising an electronic control unit, which is designed to generate an electrical message signal when the secondary pressure actual value prevailing at the secondary port does not fall below a preset residual pressure value lying above atmospheric pressure, even though the actuation element is pressurized by a control pressure lying at zero level or atmospheric level and which generates switching of the actuation element into a position allowing the first closing member to adopt its closed position.

8. A pressure regulating device according to claim 1, further comprising a secondary pressure sensor device detecting the secondary pressure prevailing at the secondary port and connected to an electronic control unit of the pressure regulating device, and containing two pressure sensors connected in parallel.

9. A pressure regulating device according to claim 1, further comprising a primary pressure sensor device detecting the primary pressure prevailing at the primary port and connected to an electronic control unit of the pressure regulating device, in cooperation with which the control pressure for the actuation element is generated.

10. A pressure regulating device according to claim 1, further comprising a pilot valve device which provides the control pressure needed to drive the actuation element and which is fed with pressure medium from the primary port.

11. A pressure regulating device according to claim 10, wherein the pressure regulating valve has a drive chamber which is bounded by a movable drive wall coupled for driving purposes to the actuation element and communicating with a control passage supplying the control pressure, wherein the pilot valve device has an electrically actuated air supply valve device connected to the control passage, and also an electrically actuated vent valve device, independent of the air supply valve device and similarly connected to the control passage.

12. A pressure regulating device according to claim 1, wherein each closing member is assigned, for spring-loading into the closed position, a separate spring device, acting with a pushing effect, and working in conjunction at one end with the assigned closing member and at the other end with the valve casing.

13. A pressure regulating device according to claim 1, wherein the two valve seats are arranged coaxially with clearance from one another and facing in opposite directions, wherein the actuation element is plunger- or rod-shaped and passes coaxially through both overflow ports and wherein the two closing members are mounted on the actuation element with the ability to move axially independently of one another.

14. A method of operating a pressure regulating device, said pressure regulating device having a pressure regulating valve which has a valve casing with a primary port for the supply of pressure medium, a pressure-regulated secondary port for connection to a load, and a vent port, wherein there is provided, between the secondary port and the primary port, a first overflow port bordered by a first valve seat and, between the secondary port and the vent port, a second overflow port bordered by a second valve seat, wherein a first closing member with a spring bias in the direction of a closed position abutting the first valve seat lies opposite the first valve seat, and a second closing member with a spring bias in the direction of a closed position abutting the second valve seat lies opposite the second valve seat, wherein both closing members belong to a regulating unit which is movable relative to the valve casing, which also contains an actuation element which is movable relative to the two closing members and is driven under the influence of a control pressure to a regulating movement relative to the valve casing, by means of which each closing member is moved into at least one open position lifted from the assigned valve seat, and wherein the regulating unit is provided, in addition to the two closing members, with a restrictor element fixed to the actuation element and accompanying the regulating movement of the former, while in a position of the actuation element which allows the first closing member to adopt its closed position, the restrictor element adopts a restriction position narrowing the flow cross-section between the primary port and the secondary port to a restricting gap, as compared to the maximum open position of the first closing member which is produced by the actuation element, wherein by using an electronic control unit and based on a preset or pre-settable secondary pressure set-point value and a secondary pressure actual value prevailing at the secondary port, a control pressure used to drive the actuation element is generated, wherein an electrical message signal is generated if the secondary pressure does not fall below a preset or pre-settable residual pressure value, even though the actuation element is so activated in respect of its control pressure that it is switched into a position allowing the first closing member to adopt its closed position.

15. A method according to claim 14, wherein the secondary pressure prevailing at the secondary port is monitored by means of a secondary pressure sensor device containing two functionally parallel-connected pressure sensors.

\* \* \* \* \*